United States Patent [19]

Paine

[11] 3,819,437
[45] June 25, 1974

[54] SONIC WELDING
[75] Inventor: Ellis Howard Paine, Woodstock, Conn.
[73] Assignee: Moldex, Inc., Wauregan, Conn.
[22] Filed: Aug. 31, 1972
(Under Rule 47)
[21] Appl. No.: 285,450

Related U.S. Application Data
[62] Division of Ser. No. 57,499, July 23, 1970, abandoned.

[52] U.S. Cl.................. 156/73, 29/470.3, 228/1
[51] Int. Cl........................................... B32b 31/26
[58] Field of Search................ 228/1; 29/470.3; 156/73

[56] References Cited
UNITED STATES PATENTS
3,462,803  8/1969  Horton............................ 156/73 X
3,602,257  8/1971  Berleyoung et al............. 156/73 X
3,666,602  5/1972  Obeda............................. 156/73 X OTHER PUBLICATIONS
Obeda, "How To Get Good Ultrasonic Welds," Modern Plastics, Nov. 1964, pgs. 130–132, 137, 191.

Primary Examiner—Edward G. Whitby
Attorney, Agent, or Firm—Curtis, Morris & Safford; Pasquale A. Razzano; Harold L. Stults

[57] ABSTRACT

A joint construction formed by sonically welding the edges of sheets of oriented nylon. The coextensive edge portions of the nylon sheets are formed with generally complementary surfaces which are at an acute angle to the flat surfaces. A plurality of ridge portions extend from the complementary surfaces substantially parallel to the adjacent edges and concentrate sonic energy introduced into the joint at the interface of the complementary surfaces to form a weld joining the sheets, with the thickness of the completed joint being substantially the same thickness as an individual sheet.

6 Claims, 3 Drawing Figures

PATENTED JUN 25 1974 3,819,437

SONIC WELDING

This is a division of application Ser. No. 57,499, filed July 23, 1970 now abandoned.

This invention relates generally to joint constructions and more particularly to a joint construction for oriented thermoplastic sheet material which is adapted to be sonically welded to form a joint of substantially the same thickness as the original sheets.

Joint constructions for sonic welding of thermoplastic sheet materials have previously been proposed in which the adjacent edges of the thermoplastic sheets are merely overlapped and sonic energy is introduced to the overlapped portions to melt the interface surfaces of the sheets to cause the thermoplastic material at the interface to flow together and form a weld joining the sheets. The difficulty presented by sonically welded joints of this character is that the joint is relatively weak in the lateral direction thereof, that is, in the direction across the joint and perpendicular to the machine direction of the sheets as they are formed in a conventional sheet-rolling process. The completed joint, due to melting of all of the material at the interface, is substantially thicker than the thickness of the sheets themselves, thus forming an uneven surface on the sheet and moreover, due to the smooth surfaces of the material it is difficult to maintain a uniform overlap along the length of the joint during the welding process.

Other attempts at joining thermoplastic sheet material have been proposed which utilize adhesives applied to the interface of overlapped thermoplastic sheets to bond the sheets together. The use of adhesive is inherently messy at best, and results in an extremely slow process due to the lengthy curing time required. While heat may be applied to such joints during the drying process, the heat has a tendency to distort and disorient the sheets so that a perfectly aligned or uniformly overlapped joint is unobtainable. Further, the solvent action of the adhesives has a tendency to severely weaken the joint in both the lateral and the machine direction thereof, and even if initially somewhat satisfactory or acceptable, the joint eventually tends to become weak and brittle with age. Moreover, escape of the adhesive material from the bonding zone spoils the appearance if not the usefulness of the sheet material.

Accordingly, it is an object of the present invention to form an improved joint construction between thermoplastic members. It is another object of the invention to provide a strong and uniform bond between oriented sheets of nylon. A further object of the invention is to provide a method of sonically welding thermoplastic sheet material and forming a joint whose thickness is substantially the same as that of the sheets being welded. A still further object of the invention is to form a joint between sheets of thermoplastic material which has substantially the same strength laterally of the joint as does the original sheets of material. A further object is to weld together sheets or strips of high tensile strength oriented nylon without impairing the desirable characteristics of the sheets or strips.

In accordance with one aspect of this invention, the adjacent edge portions of a pair of sheets of thermoplastic material, such as for example, oriented nylon, are formed with complementary surface portions thereon which are adapted to mate when the edges are overlapped. Protruding from each of these surfaces is a plurality of longitudinally extending ridge portions positioned parallel to the adjacent extreme edge of the sheet. These ridge portions serve to concentrate sonic energy introduced into the exposed side surfaces of the edge portions so as to melt the ridges at the interface of the complementary surfaces and form a weld joining the sheets. The mating surfaces are inclined with respect to the exposed sides of the edge portions, and the joint formed in this manner has substantially the same thickness as the original thermoplastic sheets. Moreover, the strength of the joint is sufficient to meet the maximum requirements in normal usage. In fact, the strength of the joint in the general plane of the sheets transverse to the longitudinal dimension of the weld may be substantially as great as the strength of the sheets in that direction.

The above, and other objects, features and advantages of this invention will be apparent in the following detailed description of an illustrative embodiment of this invention which is to be read in connection with the accompanying drawings, wherein.

Figure 1:
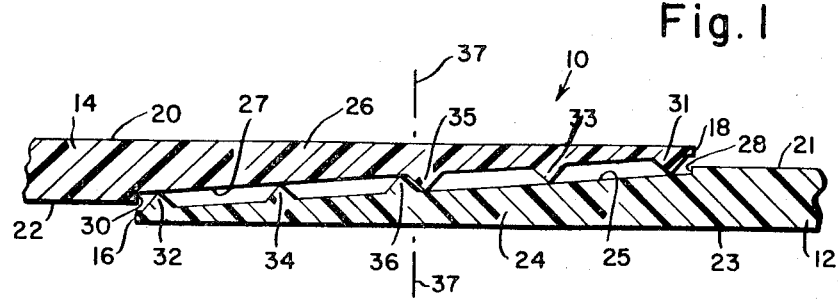
FIG. 1 is a sectional view of the overlapped side edges of two continuous sheets of high tensile strength nylon positioned to form a joint construction according to one embodiment of the invention.
Figure 2:
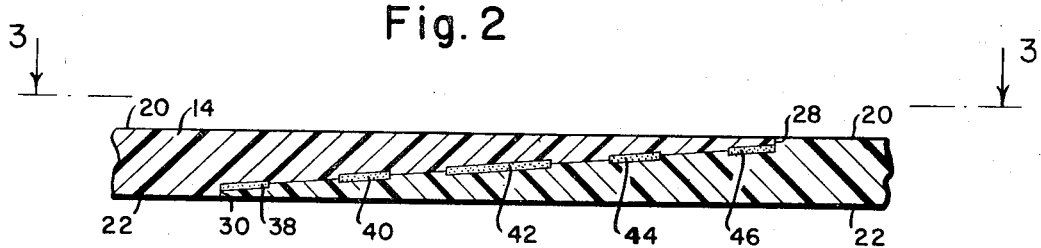
FIG. 2 is a sectional view similar to FIG. 1, showing a completed joint construction after the application of sonic vibrations thereto and welding has been completed.

Referring now to the drawings, and initially to FIGS. 1 and 2 thereof, a joint construction 10 embodying the present invention, is formed to join the side edges of two continuous sheets 12 and 14 of high tensile oriented nylon, which are illustrative of two adjacent thermoplastic sheets having longitudinally extending free edges 16 and 18, respectively. These oriented nylon sheets typically have a tensile strength in the machine direction of between 10,000 psi to 45,000 psi and in the transverse direction of between 10,000 psi and 11,500 psi.

Each of sheets 12 and 14 has an upper surface 20 and 21 respectively and an opposed lower surface 22 and 23 respectively and these surfaces lie in the same respective planes upon completion of the welding operation to form a planar web or sheet of material.

Sheet 12 has a tapered edge portion 24 adjacent edge 16, the bottom surface of which is an extension surface 23 and the top surface of which is a surface 25. Edge portion 24 has a minimum thickness at edge 16, and a maximum thickness at shoulder 28 adjacent its juncture with sheet 12 adjacent surface 21. Sheet 14 is similarly formed with an edge portion 26 having surfaces 20 and 27 and with its minimum thickness at edge 18 and its maximum thickness at shoulder 30 adjacent surface 22. The sum of the minimum thickness of each edge portion and the maximum thickness of the other portion is substantially equal to the thickness of sheets 12 and 14.

Edge portion 24 has three parallel ridges 32, 34 and 36 along its surface 25, ridge 32 being adjacent edge 16, ridge 36 being adjacent the center line 37 and ridge 34 being equally spaced therebetween. Edge portion 26 has identical ridges 31, 33 and 35 which are correspondingly positioned. The ridges are triangular in cross-section so that each of them has its apex making a line contact with the inclined surface of the other edge portion, also, the side surfaces of ridges 35 and 36 and the center line 37 are in mating relationship, i.e., the two surfaces are in contact substantially from edge to edge and throughout the length of the edge portion 24 and 26. Hence, when sheets 12 and 14 are positioned as shown in FIG. 1, the edge portions are in a complementary relationship and the engagement of surfaces 35 and 36 ensure proper alignment of the sheets. Edge 16 is aligned with shoulder 30 and edge 18 is aligned with shoulder 28.

To accomplish sonic welding, sheets 12 and 14 are positioned, as shown in FIG. 1, with their edge portions fed past a sonic vibrating tool which applies high frequency vibrations to the surfaces 20 and 23 at the joint. Such a device may produce vibrations in the audio range or above, i.e., in the ultrasonic range, for example, vibratory frequencies suitable for use in this embodiment of the invention are of the order of 16,000 to 30,000 oscillations per second. However, it is understood that the term "sonic vibrations" may refer to any vibrations within either the audio or ultrasonic range as characterized by the exemplary frequencies noted.

As the vibrations oscillate the edge portions 24 and 26 towards each other the energy of the vibrations is concentrated along the lines of contact between the ridges and the inclined surfaces 25 and 27, and the plastic throughout the zones of those lines is melted and the edge portions are fused together. The material comprising the ridges flows along surfaces 25 and 27 and produces bands of fused material. Sheets 12 and 14 are urged towards each other during the welding process so that surfaces 24 and 25 come into intimate contact and the melted ridges form relatively wide bands of fused thermoplastic material at the interface between the surfaces. The band produced by adjacent ridges 35 and 36 is somewhat wider than the bands formed by the other ridges since substantially more material is located at the centerline of the joint. However, upon completion of the welding operation of the joint thus formed has substantially the same thickness as the thickness of the original sheets 12 and 14.

Figure 3:
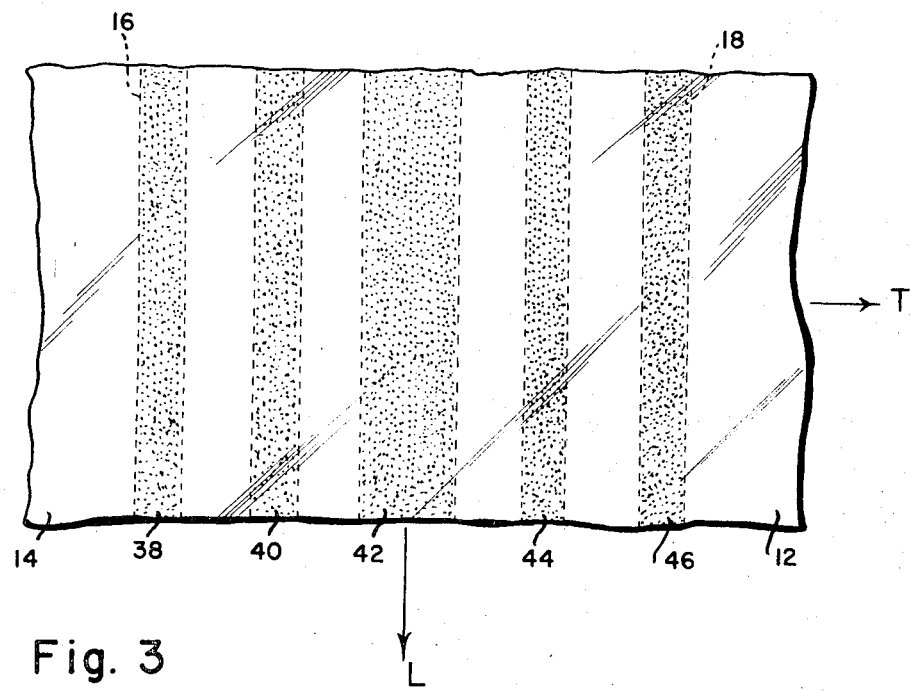
FIG. 3 is a plan view of the completed joint shown in FIG. 2 and taken on lines 3—3 thereof.

As seen in FIG. 3, bands 38, 40, 42, 44 and 46 formed by the ridges extend longitudinally parallel to edges 16 and 18 of the sheets and there are non-fused sections therebetween. Typically, the fused portion of the joint constitutes approximately 50 percent of the area of the overlap between surfaces 25 and 27 at the joint.

It has been found that a typical joint constructed in accordance with this invention will have a tensile strength of the general order of those of the original sheets in the longitudinal or machine direction of the sheet, as indicated by the arrow L in FIG. 3, that is, a tensile strength of between 35,000 and 45,000 psi in the direction in which the thermoplastic sheets are discharged from the roll-forming operation. Moreover, in the lateral or transverse direction (arrow T in FIG. 3) the tensile strength is approximately 80 percent of the tensile strength of the original sheet material in that direction, that is, a tensile strength of between 8,000 and 9,000 psi.

In the conventional lap joint constructions of the prior art, the lateral or transverse strength of sonically welded joints has generally 50 percent or less of the actual tensile strength of the parent material in that direction, and it is clear that the transverse strength of sonically welded joints is substantially increased by joint constructions in accordance with the present invention.

As mentioned above, in the joint of the illustrative embodiment substantially 50 percent of the areas of surfaces 25 and 27 are welded together. However, each weld area is inclined with respect to the side surfaces of the sheets. Hence, tensile forces along the line of arrow T subject the weld to tensile stresses as well as shear stresses. Since the tensile strength of the thermoplastic materials being joined is substantially greater than their shear strength, the cooperation of the substantially greater tensile strength of the material with its shear strength in the inclined joint construction produces the increased strength of the joint.

In addition, the inclined posture of the welds provides a greater area for the welds than would be provided with a butt weld. That is, the area of a butt weld is the thickness of the sheet times the length of the sheet, whereas the weld area in the illustrative embodiment has a total area which is substantially greater, e.g., more than four times as great. On the other hand, when two sheets are merely overlapped and welded to form a joint, the maximum weld area is the area of the overlap but that area is still less than the overlapping area of inclined surfaces 25 and 27. It is thus seen that the present invention provides inclined welding areas and the utilization of tensile strength of relatively large areas as well as shear strength.

Joints formed in accordance with this invention have been produced in thermoplastic sheet materials such as nylon which have a width between opposed surfaces 20 and 22 of between 0.02 and 0.07 of an inch, and yet relatively high transverse joint strengths are readily achieved. The joint of this invention and the method of producing the same is readily adapted to the production of elongated sheets or tapes of thermoplastic material in a continuous process, since the method of joining the sheets is relatively simple and the ridge edges, which are uniform in construction and parallel to the edges of the material are adapted to be formed in continuous milling or rolling operations. Moreover, the completed joint has a thickness which is substantially the same as that of the original sheet material so that the completed produce has a smooth and relatively uniform surface.

Although an illustrative embodiment of the invention has been described herein with reference to the accompanying drawings and specifically with reference to oriented nylon, it is to be understood that the invention is not limited to this precise embodiment or that precise material, and that other materials may readily be joined by the present invention and that various changes and modifications may be effected therein by one skilled in the art without departing from the scope or spirit of this invention.

What is claimed is:

1. A method of joining the adjacent edge portions of two relatively flat oriented nylon sheets having opposed flat surfaces and thickness of between 0.02 and 0.07 inches, said method comprising, the steps of, forming tapered edge portions on said sheets with at least one longitudinally extending ridge on each of said sheets located adjacent the longitudinal centerline of said edge portions, said tapered edge portions defining complementary inclined surfaces extending at acute angles to the flat surfaces of their respective sheets, with each of said edge portions having a maximum thickness at its point of juncture with its associated sheet and a minimum thickness at the extreme free edge thereof, whereby the sum of said minimum thickness at each of said edge portions and said maximum thickness of the other of said edge portions are substantially equal to the thickness of said sheets, positioning said edge portions in overlapping relation with said ridges in contact with each other, and introducing sonic energy into and along said overlapped edge portions in a direction generally perpendicular to said flat surfaces so as to transmit said energy to said ridge to melt said ridge at the interface of said edge portions to form a weld joining said sheets at a joint having a thickness substantially equal to the thickness of said sheets.

2. The method of joining the adjacent edge portions of two relatively flat sheet portions of thermoplastic material wherein said sheet portions each have a pair of opposed flat surfaces, said method comprising the steps of, forming edge portions of said thermoplastic sheet portions with complementary inclined surfaces in one of said flat surfaces of each of said pair of flat surfaces, with said inclined surfaces extending at acute angles to the other of the flat surfaces of their respective sheet portions to define a minimum thickness at the extreme free edges thereof and having at least one longitudinally extending ridge thereon, positioning said inclined surfaces in overlapping relation with the minimum thickness of each edge portion adjacent the maximum thickness of the other edge portion, and introducing sonic energy into and along said overlapped edge portions in a direction generally perpendicular to said flat surfaces so as to transmit said energy to said ridge to melt said ridge at the interface of said inclined surfaces, thereby to form a weld joining said thermoplastic sheet portions.

3. The method as defined in claim 2 wherein said two relatively flat sheet portions comprise individual sheets and said edge portions are formed in predetermined dimensions wherein the sum of said minimum thickness of each of said edge portions and the maximum thickness of the other of said edge portions are substantially equal to the thickness of one of said sheets.

4. The method as defined in claim 3 wherein said forming step comprises the step of forming a first ridge adjacent the longitudinal centerline of each of said inclined surfaces whereby said first ridges engage each other to maintain alignment of said sheets during welding.

5. The method as defined in claim 4 wherein said forming step includes the step of forming at least two additional ridges on each of said inclined surfaces on the side of said first ridge adjacent the extreme edge of said members.

6. A method as defined in claim 3 wherein said forming step includes the step of forming a plurality of ridges on said inclined surfaces.

* * * * *